(12) United States Patent
Adams

(10) Patent No.: US 10,642,678 B1
(45) Date of Patent: *May 5, 2020

(54) PCI/PCIE-NON-COMPLIANCE-VULNERABILITY DETECTION APPARATUS AND METHOD

(71) Applicant: Phillip M. Adams, Afton, WY (US)

(72) Inventor: Phillip M. Adams, Afton, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/253,017

(22) Filed: Jan. 21, 2019

Related U.S. Application Data

(62) Division of application No. 15/849,984, filed on Dec. 21, 2017, now Pat. No. 10,185,616.

(51) Int. Cl.
*G06F 21/57* (2013.01)
*G06F 11/07* (2006.01)

(52) U.S. Cl.
CPC ........ *G06F 11/079* (2013.01); *G06F 11/0706* (2013.01); *G06F 11/0751* (2013.01); *G06F 21/577* (2013.01); *G06F 2221/034* (2013.01)

(58) Field of Classification Search
CPC .................................................. G06F 21/577
See application file for complete search history.

(56) References Cited

U.S. PATENT DOCUMENTS

| | | | |
|---|---|---|---|
| 5,903,894 A | 5/1999 | Reneris | |
| 6,112,164 A | 8/2000 | Hobson | |
| 7,769,836 B2 | 8/2010 | Bolay et al. | |
| 8,495,745 B1 | 7/2013 | Schrecker et al. | |
| 9,449,176 B1 | 9/2016 | Adams | |
| 9,858,139 B1 | 1/2018 | Adams | |
| 10,185,616 B1 * | 1/2019 | Adams | G06F 21/577 |
| 2003/0135683 A1 * | 7/2003 | Moy | G06F 11/221 |
| | | | 710/305 |
| 2006/0156154 A1 | 7/2006 | Driedlger | |
| 2013/0185802 A1 | 7/2013 | Tibeica et al. | |
| 2014/0033272 A1 | 1/2014 | Harris et al. | |
| 2014/0149689 A1 | 5/2014 | Blaner et al. | |

OTHER PUBLICATIONS

Intel I/O Controller Hub 9 (ICH9) Datasheet, Aug. 2008.
Intel 6 Series Chipset and Intel C200 Series Chipset Datasheet, May 2011.

(Continued)

*Primary Examiner* — David J Pearson
(74) *Attorney, Agent, or Firm* — Pate Baird, PLLC

(57) ABSTRACT

Identifying and selecting a specific component of a computing system, typically by accessing its PCI and PCI Express (PCIe) configuration address space, an apparatus and method discover actual control or configuration addresses and characterize each as documented, partially documented, reserved, partially reserved, documented reserved test, partially documented reserved test, or undocumented. A filtered subset is tested by accessing each address contained in the subset, and verifying either continuity or failure of operation of the tested component or the system in response to that access. Attempting to read from or write to (or both) subset addresses proves the component and system to be compliant or non-compliant with the specification.

17 Claims, 11 Drawing Sheets

(56) References Cited

OTHER PUBLICATIONS

Intel 82801EB I/O Controller Hub 5 (ICH5)/Intel 82801ER I/O Controller Hub 5 R (ICH5R) Datasheet, Apr. 2003.
Standard Microsystems Corporation, Advanced High-Performance Multi-Mode Parallel Port Super I/O Floppy Disk Controllers, FDC37C665GT, Datasheet, Nov. 28, 1994.
ITE Tech, Inc., Simple Low Pin Count Input/ Output (Simple LPC I/O) IT8705F/IT8705AF, Preliminary Specification V0.4, 2003.
SMSC Success By Design, LPC47N217 64-Pin Super I/O with LPC Interface Datasheet, 2004.
SMSC Standard Microsystems Corporation, LPC47N227 100 Pin Super I/O with LPC Interface for Notebook Applications, Mar. 29, 2000.
SMSC Success By Design, LPC47N350 Legacy-Free Keyboard/ Embedded Controller with SPI and LPC Docking Interface Datasheet, Jan. 14, 2003.
SMSC Standard Microsystems Corporation, LPC61W492 Integrated Super I/O Controller for LPC Bus with Game and MIDI Ports/Plus Hardware Monitoring Functions, Mar. 29, 2000.
SMSC Success By Design, SIO10N268 Advanced Notebook I/O for ISA or LPC Designs with X-Bus Interface for I/O, Memory, and FWH Emulation and Four Serial Ports Datasheet, May 24, 2005.
Winbond, W83627DHG Winbond LPC I/O, Apr. 10, 2007.

\* cited by examiner

Global Configuration Registers

| LDN | Index | R/W | Reset | Configuration Registers or Action |
|-----|-------|-----|-------|-----------------------------------|
| All | 02h | W | NA | Configure Control |
| All | 07h | R/W | NA | Logical Device Number (LDN) |
| All | 20h | R | 87h | Chip ID Byte 1 |
| All | 21h | R | 02h | Chip ID Byte 2 |
| All | 22h | R | 02h | Chip Version |
| All | 23h | R/W | 00h | Clock Selection Register |
| All | 24h | R/W | 00h | Software Suspend |
| 07h | 25h | R/W | 00h | GPIO Set 1 Multi-Function Pin Selection Register |
| 07h | 26h | R/W | 00h | GPIO Set 2 Multi-Function Pin Selection Register |
| 07h | 27h | R/W | 00h | GPIO Set 3 Multi-Function Pin Selection Register |
| 07h | 28h | R/W | 00h | GPIO Set 4 Multi-Function Pin Selection Register |
| 07h | 29h | R/W | 00h | GPIO Set 5 Multi-Function Pin Selection Register |
| F4h | 2Fh | R/W | 00h | Test 1 Resister |
| F4h | 2Fh | R/W | 00h | Test 2 Register |

FIG. 9

Chip (Global) Control Registers

| Index | R/W | Default Value | Description |
|---|---|---|---|
| 02h | Write Only | | Software Reset |
| 07h | R/W | 00h | Logical Device |
| 20h | Read Only | B0h | Chip ID, MSB |
| 21h | Read Only | 7xh | Chip ID, LSB |
| 22h | R/W | FFh | Device Power Down |
| 23h | R/W | 00h | Immediate Power Down |
| 24h | R/W | 0100_0ss0b | Global Option |
| 25h | R/W | 00h | Interface Tri-state Enable |
| 26h | R/W | 0s000000b | Global Option |
| 27h | | Reserved | |
| 28h | R/W | 50h | Global Option |
| 29h | R/W | 00h | Multi-function Pin Selection |
| 2Ah | R/W | 00h | SPI Configuration |
| 2Bh | | Reserved | |
| 2Ch | R/W | E2h | Multi-function Pin Selection |
| 2Dh | R/W | 21h | Multi-function Pin Selection |
| 2Eh | R/W | 00h | Reserved |
| 2Fh | R/W | 00h | Reserved |

FIG. 11

PCI/PCIE-NON-COMPLIANCE-VULNERABILITY DETECTION APPARATUS AND METHOD

RELATED APPLICATIONS

This application: is a divisional of U.S. patent application Ser. No. 15/849,984, filed Dec. 21, 2017; which is a divisional of U.S. patent application Ser. No. 15/256,902, filed Sep. 6, 2016; which is a divisional (continuation) of U.S. patent application Ser. No. 14/284,548, filed May 22, 2014; which claims the benefit of U.S. Provisional Patent Application Ser. No. 61/831,714, filed Jun. 6, 2013; all of which are incorporated herein by reference in their entirety.

BACKGROUND

Field of the Invention

This invention relates to computing systems and, more particularly, to novel systems and methods for testing system and component vulnerability to design features and functionality.

Background Art

Computing systems, ranging from Systems on Chips (SoC) to multi-processor, large-scale computer complexes, typically include multiple components and devices necessary for the functioning of the system. For example, various components and devices must be initialized when a computer system is powered on or started. Typically, computer systems typically include one or more system configuration manager modules that handle basic start up and initialization of the computer systems.

In certain systems, the Basic Input-Output System (BIOS) performs the function of system configuration management. After power on or restart, the BIOS begins executing the first instructions thereof stored in the computer systems' memory. Typically, the BIOS initializes the chip set, tests and initializes system memory, initializes and tests other system components, including I/O controllers, and may test and initialize other devices, such as peripheral devices. These subsystems, components, and devices may be tested for functionality. Typically this entire process may be considered the Power-On System Test (POST) as known in the art. Eventually, the BIOS loads a boot-loader program stored in a particular location in memory or storage, such as on a fixed disc memory device, hard drive, read only memory (ROM), or the like. The boot-loader program typically loads a control program, executive or operating system into system memory and turns control over to the loaded program. The operating system then takes control of the overall computer system.

In certain embodiments, BIOS code is embodied as firmware stored in a flash memory device. This code uses configuration data to program settings that are user configurable during POST processing. Typically, BIOS configuration data is stored in some non-volatile memory device or location. Non-volatile data used during POST typically is associated with the clock, or real-time clock (RTC), as well as such temporal information as date, other time, configurations of drive systems, settings of memory, power management particulars, operating system settings, port settings, and the like.

In general, configuration data is stored in a particular space dedicated to the purpose. For example, in any "chip" or component, certain memory locations may exist. Certain of these memory locations may be referred to as registers, or the like. Likewise, the system may provide addresses (memory addresses, register addresses, or I/O port addresses) indicating a source or destination for inputs or outputs to these registers or memory locations. Such addresses may be considered part of the configuration space, often referred to as configuration registers.

The architecture of a configuration space is typically characterized by an address and an associated value. Accesses, both reads and writes, to these addresses are typically allowed to obtain or modify the values associated with these addresses. I/O port addresses typically provide access to an I/O device or component. The I/O device or component may perform some function when accesses via the I/O port address and return the value of that function to the accessor of the I/O port address.

Architectures and technical details of typical chip sets, chips, computing devices, associated components, and the like are contained in various specifications and datasheets. For example, an Intel bridge chipset is described in Intel's April 2003 datasheet for the *Intel® 82801EB I/O Controller Hub 5 (ICH5)/Intel® 82801ER I/O Controller Hub 5 R (ICH5R)*. ICH5 is an acronym for Intel's I/O Controller Hub version 5. Furthermore, Intel's August 2008 datasheet, *Intel® I/O Controller Hub 9 (ICH9) Family*, for Intel's ICH9 and Intel's May 2011 *Intel® 6 Series Chipset and Intel® C200 Series Chipset* datasheet referred to as Intel's Q67, QM67, etc. are ICH5 progeny. Super I/O devices or components are similarly described in various specifications and datasheets. For example, the following five SMsC datasheets describe the technical details of five of SMsC's many Super I/O components: (1) *FDC37C665GT Advanced High-Performance Multi-Mode Parallel Port Super I/O Floppy Disk Controllers*, (2) *LPC47N217 64-Pin Super I/O with LPC Interface*, (3) *LPC47N227 100-Pin Super I/O with LPC Interface for Notebook Applications*, (4) *SIO10N268 Advanced Notebook I/O for ISA or LPC Designs with X-Bus Interface for I/O, Memory, and FWH Emulation and Four Serial Ports*, and (5) *LPC47N350 Legacy-Free Keyboard/ Embedded Controller with SPI and LPC Docking Interface*. Similarly, the Winbond (Nuvoton) line of Super I/O devices are described in specifications and datasheets such as, *W83627DHG Winbond LPC I/O* dated 10 Apr. 2007 and the *LPC61W492 Integrated Super I/O Controller for LPC Bus with Game and MIDI Ports/Plus Hardware Monitoring Functions*. The latter was designed by Winbond for SMsC. ITE, another major manufacturer of Super I/O devices provides detailed technical information about ITE's components in specifications and datasheets such as, *IT8705F/ IT8705AF Simple Low Pin Count Input/Output (Simple LPC I/O)*. The above datasheets for chipsets and Super I/Os provide details of architectures, nomenclature, definitions of terms, definition of operations, and so forth. Accordingly, the foregoing references are all incorporated herein by reference and relied upon for their usage and definitions of terms of art as used by those of ordinary skill in the art. Accordingly, the usage and definitions therein are adopted hereby as the ordinary meanings of such terms within this art.

Moreover, U.S. Pat. No. 5,903,894 issued May 11, 1999 to Reneris, U.S. Pat. No. 6,112,164 issued Aug. 29, 2000 to Hobson, and U.S. Pat. No. 7,769,836 issued Aug. 3, 2010, to Bolay et al. are all useful in understanding the significant elements of such architectures, their use, action schemes, operational characteristics, features, and so forth. Again, the usage, definitions of terms, and the like found therein are adopted hereby as the ordinary meanings of such terms. All the foregoing documents and patents are hereby incorporated by reference in their entirety.

Historically, software and hardware systems include vast quantities of documentation advising users on the features, commands, protocols, communications, and so forth for interacting with such systems. Nevertheless, complex systems may have other details, not typically provided to users or purchasers, which are known or unknown to the manufacturers.

Historically, certain failures of computing devices, computing components, hardware, software or combination of hardware and software are well documented. The mode of failure is well understood, and the solution for failures is readily available. Often the problem and solution are well documented and tried.

On the other hand, in certain such systems, undocumented features, registers, addresses, data, functionality, operational instructions, commands, and the like in components of a computing device may not be documented. Likewise, computing systems have a history of periodic or random failures due to unknown causes. Furthermore, continually revising a computing device or component, as in the case of Intel's I/O Controller Hubs (ICH), may lead to the introduction of new features along with remnants of undesired features or functionality.

What is needed is a system, apparatus, and method for detecting, analyzing, correcting, documenting, and otherwise handling undocumented failure modes and causes. These failure modes and causes collectively referred to as vulnerabilities herein. For example, it would be an advance in the art to create a system, apparatus, and method for systematically analyzing and evaluating computing systems and components to determine their possible susceptibility to failures due to accidental or intentional accesses to addresses that are unknown or undocumented, or whose consequences are unknown or undocumented. Such accesses typically are the result of executed instructions or hardware's direct manipulation of one or more of the system's buses. Accesses that are possible but undocumented may be unreferenced or actually prohibited. However, if still possible, they may nevertheless have consequences.

BRIEF SUMMARY OF THE INVENTION

The text and certain other materials in this patent application are subject to copyright protection by the inventor. Applicant grants a royalty free license to copy the patent documents as such for use in research or as prior art, but authorizes no other use of the text, software architecture, drawings or other works embodied herein.

In view of the foregoing, in accordance with the invention as embodied and broadly described herein, a method and apparatus are disclosed in one embodiment of the present invention as including a method, apparatus, and system for selecting, exercising, testing, and evaluating, various components. Moreover, in an apparatus and method in accordance with the invention, address spaces are identified, exercised, analyzed, and evaluated for their effects in order to determine the influence of access to undocumented locations in address spaces, access to reserved locations in address spaces, and access to reserved test locations in address spaces as a source of failures in computer systems.

For example, in a method and apparatus in accordance with the invention, components, systems, and functionality of computing systems may be exercised to determine the effects thereof on an overall computing system in which such may reside.

The invention stands in contrast to automated test equipment (ATE) in the computer industry, by which components are tested for failure on a production line prior to release. Although the present invention may be incorporated into ATE, the result of such incorporation is limited to determining a component's vulnerability to the previously described accesses. A system, however, in accordance with the invention exercises a component in order to ascertain the effect of operation of the component on the vulnerability of the component and the component's effect on the overall computing system.

For example, the fact that a particular chip in a particular integrated system has certain characteristics of operation may be tested in an ATE environment. Nevertheless, certain of those operational or data characteristics may have consequences on other components or operations in the system when the component is interconnected to other components in the system. Those consequences are not evident from ATE testing of the standalone component.

Moreover, in the development of the apparatus and method in accordance with the invention, the inventor has learned that certain components may function in compliance with the components' datasheets, yet cause failures of other components in the system. Such failures result from simple and fundamental read or write access to undocumented locations in address spaces, access to reserved locations in address spaces, and access to reserved test locations in address spaces. In one embodiment, a method and apparatus in accordance with the invention may determine vulnerability of a computing system by identifying a component of the computing system. Typically, the component will be characterized by addresses in an address space. Addresses may be thought of as a first system (or set) of addresses, a first address space. These addresses will typically be those controlling the configuration of the component, or possibly the control functionality of a component.

In one embodiment, from the basic first set of addresses, a second set of addresses may be identified, a proper subset of the first set. These second addresses, forming the second set, include those addresses within an address space that are undocumented, documented as reserved addresses, documented as reserved test addresses, or the like.

Typically, certain representations are made by a manufacturer in a datasheet associated with a component. That datasheet will identify the first set of addresses. However, a system in accordance with the invention may evaluate the entire address space defined by the first addresses, seeking unused, undocumented, reserved, or reserved test addresses. These addresses are typically represented by the manufacturer as unused or reserved for use by the manufacturer of the component, in contrast to addresses for use by purchasers and developers. Some addresses may simply be absent and undocumented.

Typically, the addresses in the address space may represent register addresses, memory addresses, or I/O addresses—I/O addresses may be referred to as I/O ports or I/O port addresses. In certain embodiments, components may be selected from physical components, virtual components existing only in a computerized environment, a simulated component being modeled by a computerized system during simulation, or an emulated component in which some device or system emulates the behavior of the emulated component, or the like. Thus, during the design process wherein a design of a component or device is modeled, simulated and operational entirely in the hardware of another computing system rather than in the component's own separate, dedicated, and physical device, an apparatus and method in accordance with the invention may still be applied.

Thus, an apparatus and method in accordance with the invention may apply to the design or simulated design process prior to actual manufacture of a physical system. Accordingly, vulnerabilities of a component or system may be determined long before committing the component to dedicated hardware manufacture.

In certain embodiments, a method in accordance with the invention may select an access method, or more than one. For example, access may be accomplished by reading from a target address within the second set of addresses. Likewise, writing to a target address may provide a different type of access. Moreover, both reading from and writing to a target address within the second set of addresses is also an alternative operation. In fact, all access operations, or combination of access operations, may be used in order to thoroughly exercise a target address in an address space and determine the consequences thereof on the vulnerability of the system in which a component and the address space corresponding to that particular component reside. Again, configuration address space may be referred to as: (1) configuration registers, (2) configuration runtime registers, (3) configuration addresses, (4) configuration space, (5) configuration address space, (6) configuration/control registers, (7) configuration/control runtime registers, (8) configuration/control addresses, (9) configuration/control space, (10) configuration/control address space, (11) any combination of the terms and phrases in numbered items 1 through 10, and (12) similar phrases and terms. The configuration address space is the address space of most interest and of most consequence in accordance with the invention as currently contemplated.

It is important to note that the configuration address space is component specific. That is, according to its hardware architecture, a component will have a designated configuration address space unique to itself. That configuration address space is typically used on a component basis in a system and method in accordance with the invention. Thus, based on the component's functionality, as defined in the component's datasheet, the configuration address space will be exercised by the method in order to actualize the resulting functionality of the component as: proper, improper, intended, unintended, known, or unknown.

In another embodiment, a method in accordance with the invention may include programming a process (implemented in software, hardware or a combination of both) for a particular functionality wherein programming comprises providing an address population module to define the first set of addresses, providing an address selection module to select the second addresses, and providing an access module (e.g., instruction, executables, program, hardware) to access certain target addresses within the second set (subset) of addresses. Typically, the target addresses will be selected sequentially from among the second addresses, and each will be accessed by one or more modes. Alternatively, a single target address, or subset of target addresses, may be selected from the second set (subset) of addresses and accessed in one or more access modes.

Thereafter, the system will be tested to determine whether it is still operational. Meanwhile, the system may report or document in a verification module whether the system is still functioning. As a practical matter, if the system completely fails, verification may simply be reduced to detecting or otherwise identifying a non-functioning computing system or unresponsive operating environment.

In another apparatus and method, directed to determining vulnerability of a computer system, the method may begin by identifying a component of a computing system, where the component is characterized by an address space specifically corresponding thereto. Typically, by controlling at least one of the control operations or the configurations of the component, these address spaces being unique to the component.

Providing a processor may include operably connecting the processor to receive or select the addresses. For example, the first set of addresses may be filtered to produce a second set of addresses as a subset thereof. Typically, the addresses will each be target in any reasonable sequence, such as in numerical order (ascending or descending address). Thereafter, the system will access each target address and verify by the operation of the processor whether the component remains functional, whether the system remains functional, or the like. Similarly, the system will access a single target address, or subset of target addresses from the second set of addresses, and verify by the operation of the processor whether the component remains functional, whether the system remains functional, or the like.

In certain embodiments, the processor may be programmed through a programming interface, and may thus be any processor within the computing system. For example, several processors or co-processors exist together in many modern computing systems. In fact, various controllers and components within an overall computing system have their own dedicated processes, processors, memory, registers, or the like.

Thus, programming may include providing an address population in a configuration address space, selecting from the address population a second set of addresses, selecting, in sequence, target addresses from among the second address set, and accessing those target addresses. On verification that the access (e.g. reading, writing, or both) with respect to the target address results in the system continuing to function properly, the process may continue to other target addresses within the second address space or set.

Typically, the second addresses will be a proper subset of the first addresses. Typically, the processor may be outside a component. Nevertheless, in certain embodiments, the processor within an individual component may actually be used to exercise that component. Thus, various programming may be programmed into a processor, which then accesses a configuration address space, resulting in analyzing through exercising those addresses, whether registers, memory locations, or I/O addresses.

In yet another embodiment, a hardware implementation in accordance with the invention may involve a hardware unit that is connected into a computing system. The unit may include a Bus Interface Unit (BIU) suitable for communication over a bus to other components within the system. Meanwhile, an address decoder may receive address information from the BIU for the purpose of determining whether information presented on the bus is directed to the hardware unit. Accordingly, control logic within the hardware unit implements the functionality of a system and method in accordance with the invention.

For example, the control logic may be embodied or embedded in hardware, software, firmware, microcode or any suitable combination of hardware, software, firmware, and microcode. That control logic may conduct all of the process steps and run (execute) the executables, if any, required for implementing those process steps in accordance with the invention.

Thus, the control logic may also assert control over operation of the bus interface unit, the address decoder, and the access for data transfers into or out of the unit with respect to other components within the computing system.

Thus, in an apparatus and method in accordance with the invention, the steps of a method may be implemented in software stored in a memory device and executing on a processor external to components, within a computing system, that are being evaluated with the system for vulnerability. In other embodiments, the steps of a method may be implemented in software stored in a memory device and executing on a processor within a component may be used for evaluating the vulnerability of another component within a connected computing system. In yet another embodiment, the logic effective to implement a process in accordance with the invention (e.g., for programming a processor) may be loaded into an embedded processor within a component in order to evaluate the vulnerability of that component, or the vulnerability of the system as a result of the operation of that component.

Whether implemented in software, hardware, firmware, microcode, or executable instructions on a processor within the unit, the control logic may be implemented to effect a process in accordance with the invention. Likewise, any combination or subcombination of hardware, firmware, software, microcode, or the like may be used to implement a process in accordance with the invention. Finally, a separate hardware unit may be implemented, connected into the computing system on a suitable bus contained therein, and implement in hardware the bus interface, the address decoding, all of the control logic, and the executable modules, if any, for implementing the process.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 9 is a chart showing a partial description of the configuration address space, configuration registers, of the hardware for the component of FIG. 8;

FIG. 11 is a chart showing a partial excerpt from the chip global control registers for the configuration space of the hardware of FIG. 10.

DETAILED DESCRIPTION OF THE PREFERRED EMBODIMENTS

Figure 1:
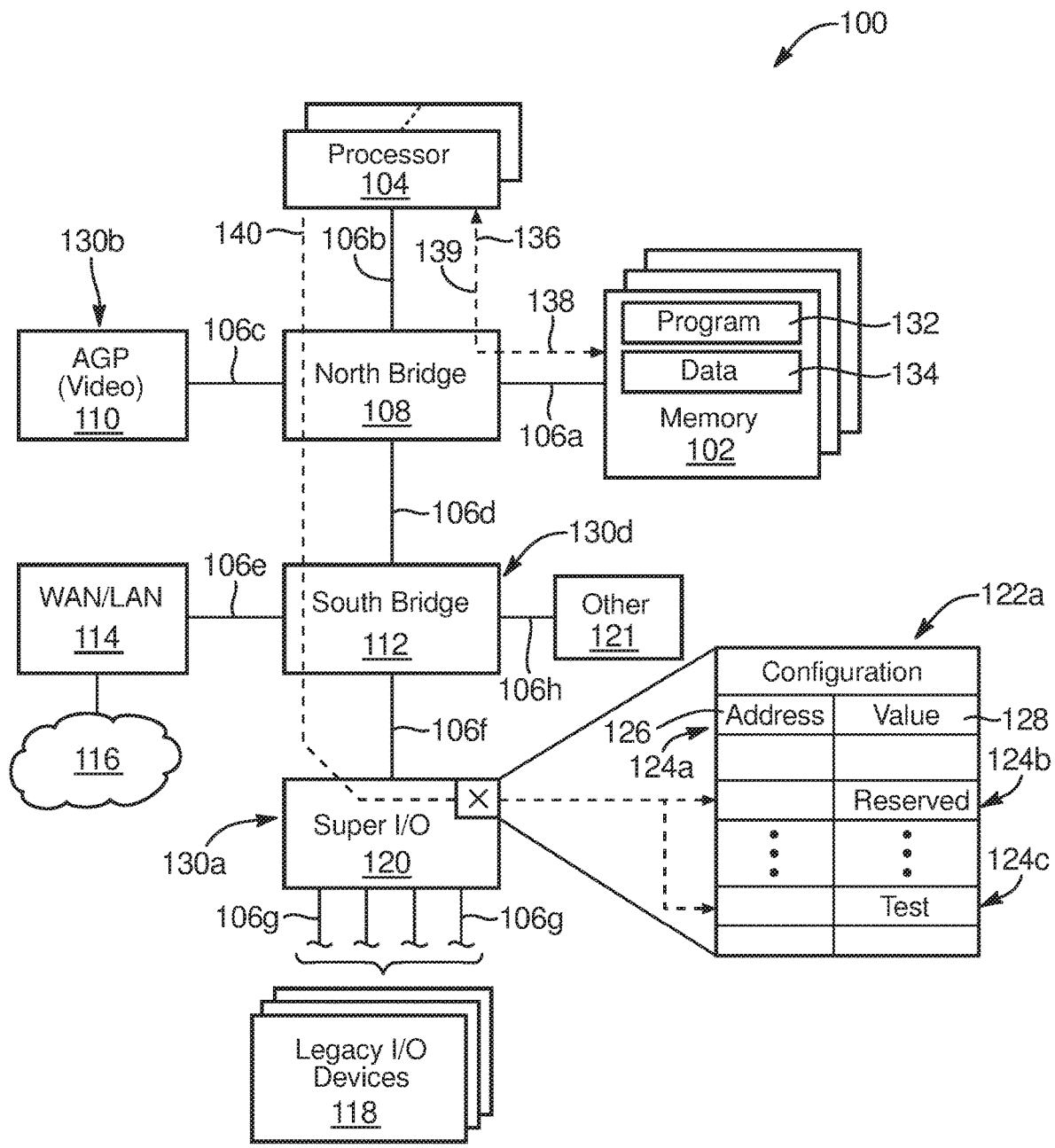
FIG. 1 is a schematic block diagram of one embodiment of a computing system implementing a process in accordance with the invention, targeting a Super I/O component.

It will be readily understood that the elements of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, a computing system 100 or simply a system 100 in accordance with the invention may rely on a configuration of hardware implementing comparatively conventional or completely novel computing systems. For example, a system 100 implementing a method in accordance with the invention may include memory 102. Memory 102 may include volatile memory/storage, non volatile memory/storage, or the like. In addition, read only memory (ROM), random access memory (RAM), flash memory, hard drives, non volatile RAM (NV-RAM), or the like may be relied upon as a memory device 102 containing memory 102.

Likewise, a system may be implemented with a single processor 104 capable of fetching, decoding, and executing a computer readable instruction, or may include one or more processors 104 combined in a processor complex 104 operating in parallel, series, or the like. In the illustrated embodiment, the processor 104 may implement executable modules in accordance with the invention in order to implement processes in accordance therewith.

The buses 106 are referred to generally as buses 106 without any trailing letter. Hereinafter, any reference numeral used with the trailing letter means or indicates a specific instance of the item identified by the reference numeral. Any item using only the reference numeral means that class or type of item in general, and not necessarily limited to any specific instance.

The buses 106 may interconnect various components. For example, a bridge chipset (north bridge 108 and south bridge 112), more specifically a north bridge 108 may connect to the memory 102 by a bus 106a suitable for carrying communications traffic therebetween. Similarly, the processor 104 may connect to the north bridge 108 by the bus 106b. The various buses 106 may each have their own unique number of channels or pins for communication. In certain embodiments, similarly, the north bridge 108 may connect over the bus 106c to communicate with an advanced graphics processor 110. Advanced graphics processors 110 are a type typically used with high volume data traffic, such as video or motion images.

Thus, in general, a bus 106 may be implemented as a front side bus (FSB), a peripheral component interconnect (PCI), a PCI express interface for more rapid communication with peripheral devices, a low-pin-count interface (LPC), or the like. Such buses 106 may interconnect components within a computing system 100 in accordance with the invention.

In legacy systems, a single bus or unibus interconnects multiple components. However, with increasing levels of integration in computing systems 100, and the demand for higher volumes of data at ever increasing rates, interconnection between components has become more specialized through the introduction of newer buses 106 within a computing system 100. Most buses are multiple physical interconnects (physical wire connection, channels, or the like) with an associated protocol for data interchange thereacross between the interconnected components.

In the illustrated embodiment, a south bridge 112 is connected to the north bridge 108 over a bus 106d. In the illustrated embodiment, the demands on the north bridge 108 are substantially higher in terms volume of data and performance (e.g., speed) thereof. Accordingly, with the high volume of data traffic between the AGP 110, the processor 104 and the main memory 102 the highest performance requirements available are demanded.

In contrast, the south bridge 112 may communicate over slower buses 106 to slower components and devices. Typical of slower components or components demanding less attention by way of immediacy of data transfer may include a network 114 such as a LAN 114 or WAN 114 communicating over a bus 106e with the south bridge 112. Meanwhile, according to conventional protocols and hardware, a network 114 may communicate over an internetwork 116 with other similarly situated networks 114, in order to communicate between systems 100 remotely.

A typical example of slower components is found in legacy I/O devices 118. Such devices 118 may originate from many generations previous to a particular computing system 100. Accordingly, in order to interface with such legacy components 118, the computing system 100 should not be slowed. Legacy printers, floppy disk drives, serial devices such as modems, mechanical line printers and parallel bus printers, and the like may represent legacy I/O devices 118. Computational devices, other hardware, controllers, and various interfaces to motors, heavy electrical equipment, and other processing systems may all fit within the scope of legacy I/O devices 118.

A bus 106f may connect to a Super I/O 120 in order to consolidate the data traffic from legacy I/O devices 118 over one or more of the buses 106g.

The Super I/O 120 may handle the interface between comparatively slow data transfer handling capacities and systems such as the north bridge 108, the south bridge 112, and so forth, effectively buffering or "running interference" by handling the speed mismatch of data inputs and outputs.

In general, the network 114 and the Super I/O 120 may be thought of as exemplary of a host of other devices 121. Such other devices 121 may connect to the south bridge 112 over a suitable bus 106h. Again, devices 121 may occupy an individual bus dedicated to their own use and communication with the south bridge 112, or may be connected in a more conventional or legacy fashion as several devices connected to a single bus 106h.

As a practical matter, various devices may connect to the north bridge 108 through the south bridge 112. Typically, in the architecture illustrated, the higher up or closer to the processor 104 (in the Figure) a device is connected, the higher its speed, and typically its bandwidth capacity. Thus, the higher up in the figure a component connects, the closer it is to the processor and the processing speed of that component.

One may think of the Super I/O 120 as a consolidation device 120 that consolidates information and configures it for communication with the south bridge 112 or through the south bridge 112 to the north bridge 108 for eventual delivery elsewhere.

Various devices may connect to the south bridge 112, the Super I/O 120, or the like, in accordance with the computing system 100 desired by a particular designer.

For example, a universal serial bus (USB), an integrated drive electronics (IDE) storage device, a serial ATA (SATA) storage device, a Codec, such as an audio Codec, a general purpose I/O device (GPIO), a power management device, clock generator, system management device, an I2C bus, or other bus, such as the system management bus (SMbus) may all connect to dedicated or shared buses 106 connected to the south bridge 112.

Meanwhile, a peripheral component interconnect bus (PCI) may connect to several slots or PCI controllers for use by various PCI components and devices. Similarly, communications with other application specific integrated circuits (ASIC), flash basic input/output systems (BIOS), and the like may also be bused over a bus 106h, or another dedicated bus 106h to exchange data through the south bridge 112.

In the illustrated embodiment, a configuration space 122 corresponding to a particular target component 130a, such as the Super I/O 120 is identified as a pair of corresponding values. The first value of an individual address element 124 is a location 126 or address 126. The second value 128 or content 128 represents the operational data, information, content, value, instruction, or other data stored at that designated address 126 or location 126. In keeping with protocols for memory, registers, and I/O, the address 126 may indicate a position within the actual physical memory medium within a device. For example, a register or memory address may actually point to a physical space where data may be read, written, or both.

On the other hand, an I/O address may indicate a specific I/O device, I/O port address, or I/O controller. For example, I/O hubs, routers, switches, and the like, as well as analog-to-digital converters (A/D converter—ADC), digital-to-analog converters (DAC), and the like may be identified and controlled through an I/O address.

In the illustrated embodiment, specific instances of address elements 124 represent differently situated, addressable information. For example, the address element 124a represents a conventional address element having an address 126 and a value 128. In contrast, the address element 124b represents a reserved address. Similarly, the address element 124c represents a reserved test address.

In the illustrated embodiment, any component within a computing system 100 may be designated as a target component or target 130. Here, for example, the Super I/O 120 may be identified as a target component 130a. Similarly, the target component 130b is the AGP 110. Similarly, a target component 130c is the north bridge 108 itself. Similarly, the south bridge 112 may act as a target component 130d when being evaluated for vulnerability in accordance with the invention.

Each target component 130 has associated therewith, a configuration space 122. For example, in the illustrated embodiment, the configuration space 122a corresponds to the Super I/O 120 as a target component 130a.

Programs 132 may be thought of as anything from a single instruction of machine-readable code to millions of machine-readable instructions. That is, an executable represents an instruction readable from a computer-readable storage medium into a processor 104 for execution. Typically, as used herein, the term executable 132 may be used in place of executable instruction, program, module, or the like. That is, in general, a program 132 may be referred to generally as programming 132 or an executable for a processor 104. Accordingly, an executable 132 may be thought of as anything from a single instruction to many instructions that may be fetched, decoded, and executed by a processor 104. Furthermore, programs may be executed indirectly by a processor 104 (non-native instructions) executing an interpreter for non-native instructions (interpretive instructions).

Similarly, in memory 102 may be stored operational data 134, or simply referred to as data 134. As a practical matter, executables 132 or programs 132 are also "data" or data structures. However, these data structures are recognized by processors 104 as instructions to be read, as described hereinabove. By the same token, operational data 134 or data 134 is a data structure, but generally is regarded simply as containing numerical information or other data that is to be used by a processor 104 as instructed by executable instructions 132 or programs 132.

For example, an equation may be thought of as an executable. Data to put into the equation or to solve that equation for a particular value corresponding to that input data, is simply data 134.

A processor 104 may read 136 from memory 102. Likewise, a processor 104 may write 138 to memory 102. Whether reading 136 or writing 138, the processor 104 is accessing 139 memory 102.

As a practical matter, memory access 139 may be reading 136, writing 138, or both 136, 138 to any particular component capable of sending or receiving data 134.

In contrast, access 140 by a processor 104 to the configuration space 122 typically will require special programming instructions peculiar to the specific target component 130. In the illustrated embodiment, this means that the processor 104 may access 140 through the Super I/O 120 as a target component 130a, the configuration space 122a specific to the Super I/O 120. In general, the configuration space 122a is unique and integral to each individual component to which it is dedicated.

In summary, the access 140 to a configuration space 122a requires a component-specific access method 140. That access method 140 is disclosed as part of the specification of the component 130a.

Figure 2:
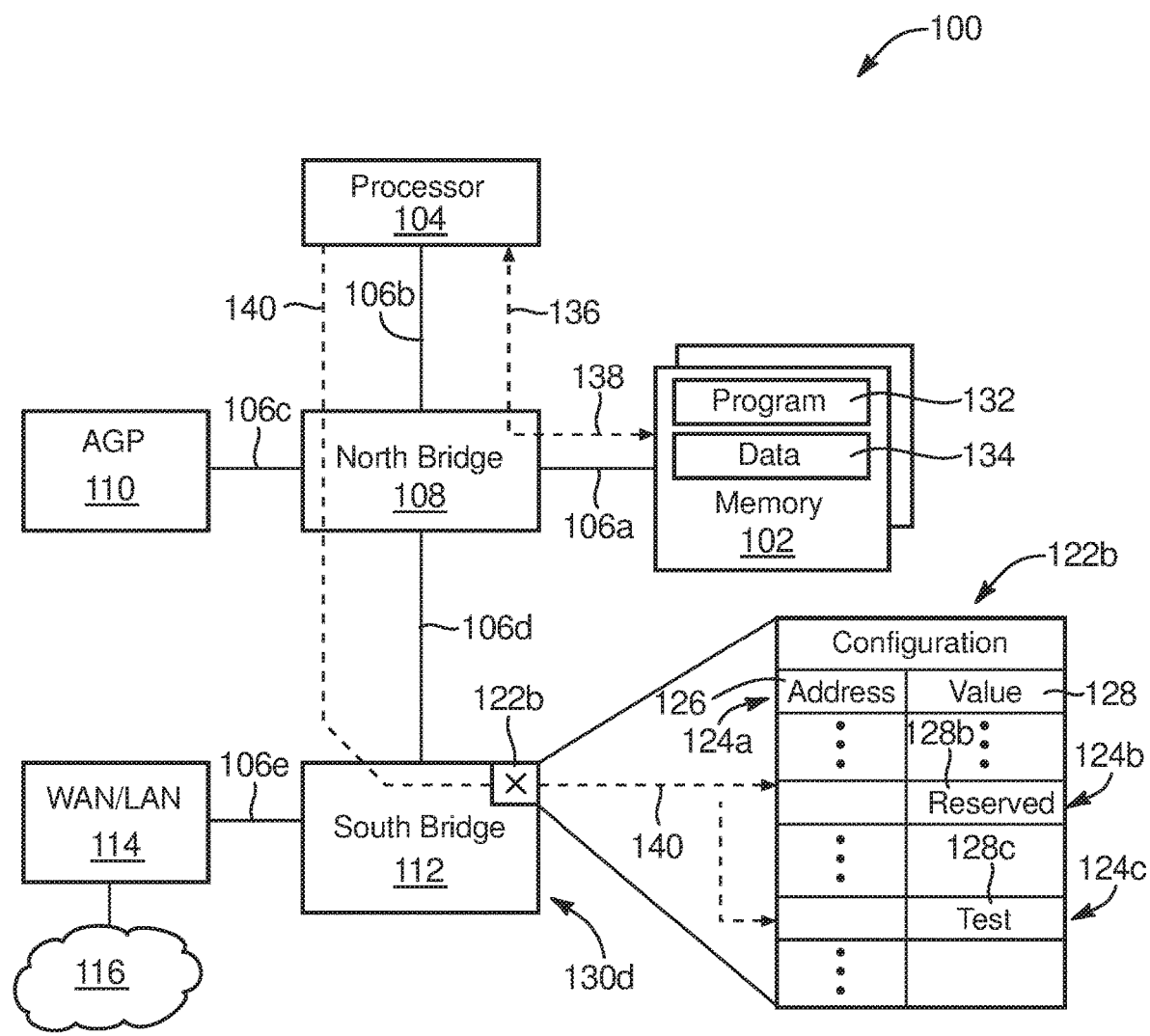
FIG. 2 is a schematic block diagram of an alternative embodiment of a computing system suitable for implementing a process in accordance with the invention, targeting a south bridge component of the computing system.
Figure 3:
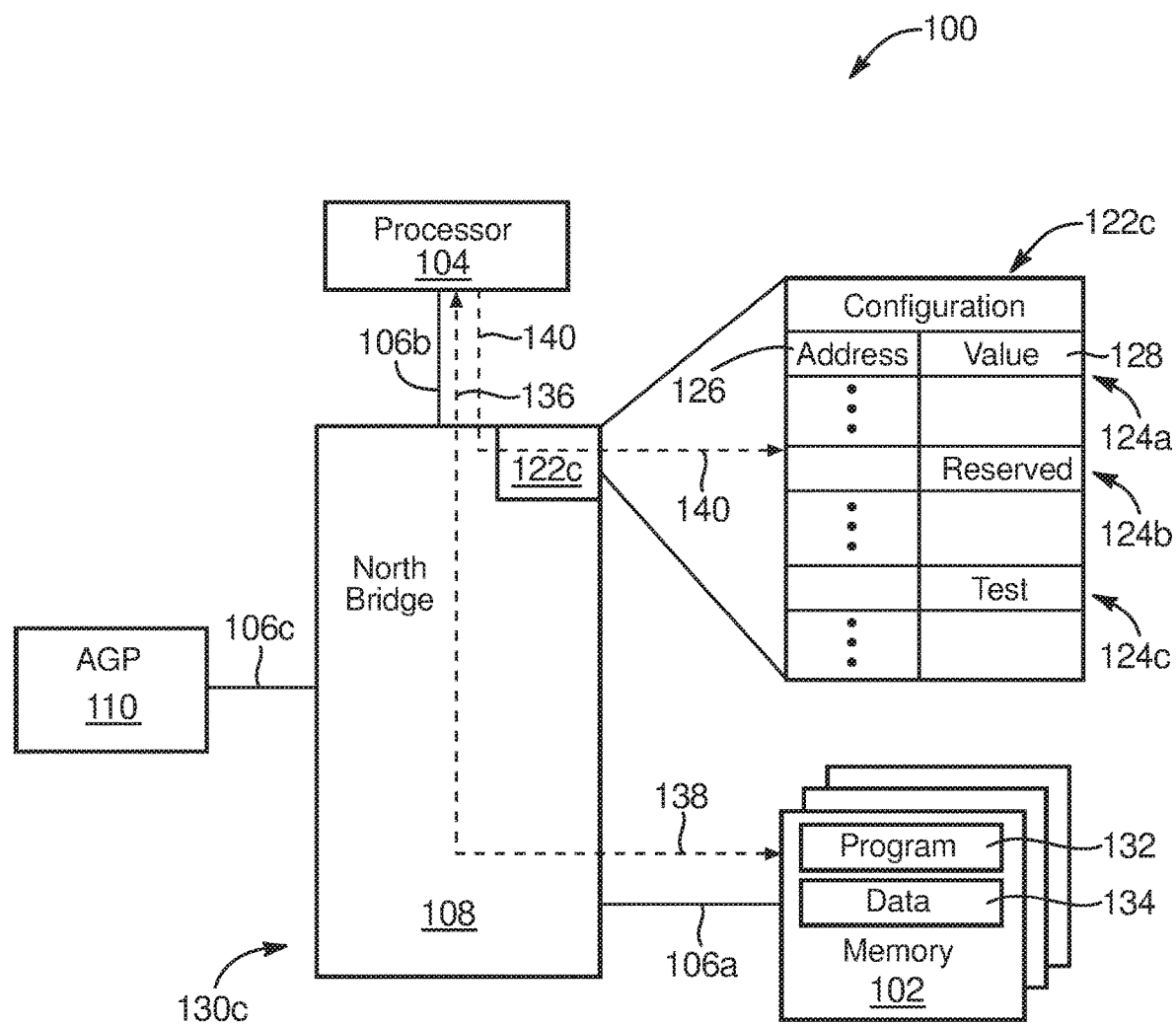
FIG. 3 is a schematic block diagram of an alternative embodiment of a computing system for implementing a method in accordance with the invention, targeting a north bridge component of the computing system.

Referring to FIGS. 1 through 3, while referring generally to FIGS. 1 through 11, an alternative embodiment of a system 100 implementing a method in accordance with the invention, may be directed to a different target component 130d. The embodiment of FIG. 2 omits components below the south bridge 112 of FIG. 1. Those components may not exist in a particular architecture. They may simply be ignored for purposes of evaluating the vulnerability associated with the south bridge 112 as the target component 130d. In the illustrated embodiment, the south bridge 112, as the target component 130d being evaluated, has its own component-specific configuration space 122b. Accordingly, that configuration space 122b may only be accessed 140 by the component-specific configuration space access method. That access method 140 may be documented in the specifications, datasheets, or both corresponding that particular target component 130d.

Referring to FIG. 3, while continuing to refer to FIGS. 1 through 3, and FIGS. 1 through 11 generally, the north bridge 108 may itself operate as a target component 130c for purposes of vulnerability evaluation in accordance with the invention. Again, the north bridge 108 as a target component 130c has its own component-specific configuration space 122c accessible only by a component-specific, configuration-space, access method 140. That is, any access 140 to the configuration space 122c is by an access method 140 specified for and unique to the target component 130c.

Figure 4:
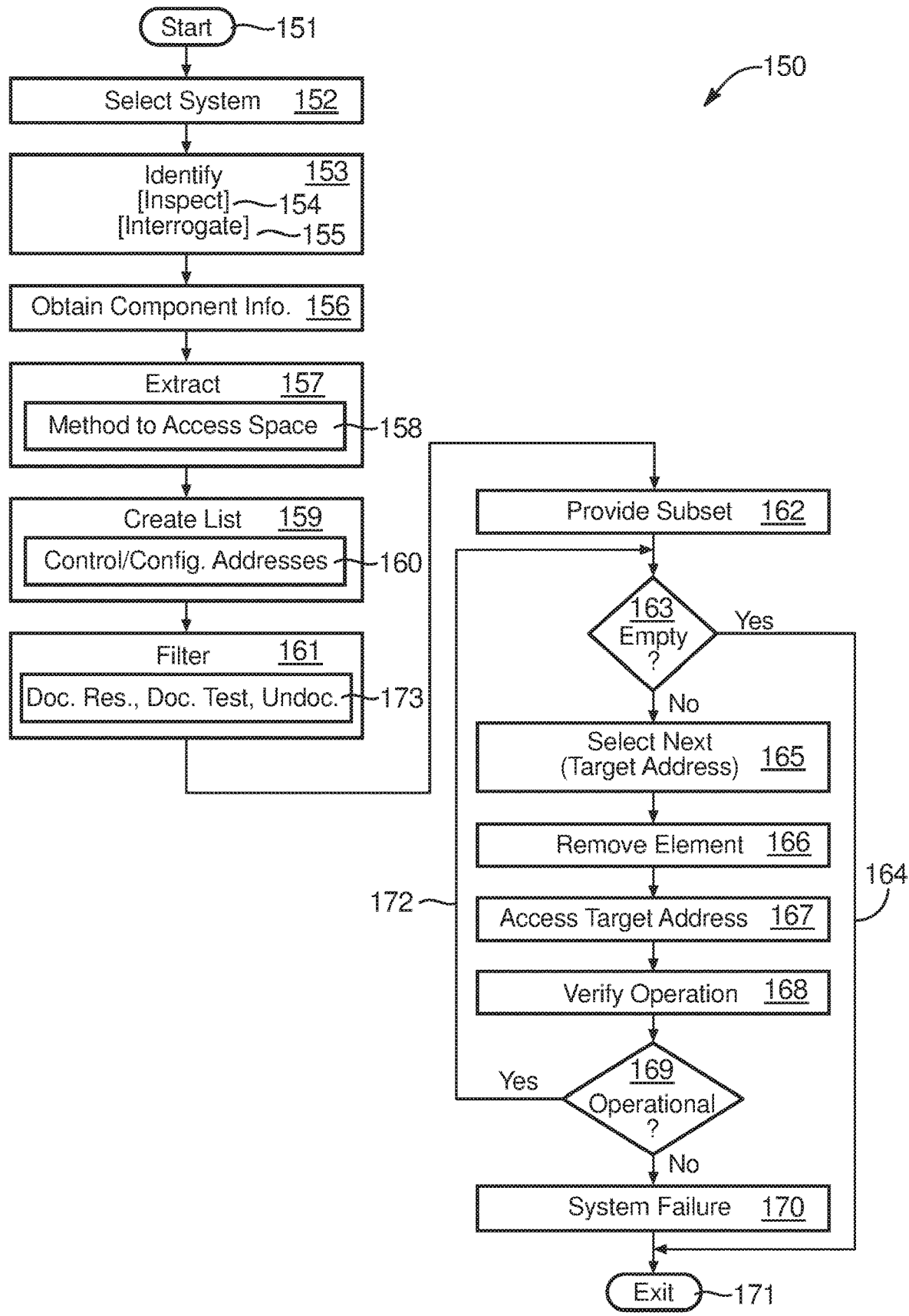
FIG. 4 is a schematic block diagram of one embodiment of a process showing the flow chart of steps in implementing this embodiment in accordance with the invention.

Referring to FIG. 4, a process or method 150 in accordance with the invention may start 151 by or begins 151 by selecting 152 a system 100. Typically, a computing system 100 may be selected 152 automatically, manually, mechanically, electronically, by programmatic control, by operation of an evaluation scheme and procedure, or the like. Typically, in one embodiment, selecting 152 a computing system 100 may involve deliberate testing of a particular computing system 100 slated for, or already in, the flow of commerce.

As a practical matter, selecting 152 may be done at any point in the development, manufacturing, testing, delivery, or operation of a particular computing system 100. For example, a virtual system or modeled system 100 may be selected 152 electronically while still in the "drawing board" stage, where it exists only as a program within a computer. Similarly, a physical bread board or physically manufactured system 100 may be mechanically or programmatically selected 152. By the same token, a simulated component, emulated component, or the like may be a selected 152 system 100.

The process 150 may identify 153 a computing system 100 by any of several means. That is, identification in computing systems 100 is often available by executing certain test instructions, providing certain inputs, or simply extracted from the documentation provided with or about the system 100.

Identifying 153 a particular component 130 within a computing system 100 may be accomplished by inspection 154 or interrogation 155. An individual may visually inspect 154 a component 130, and find information identifying 153 that component. Similarly, by interrogating 155 a component (programmatically, electronically, or otherwise) over a connecting bus 106, the component 130 may identify itself. The brackets around terms indicate that to inspect 154 or to interrogate 155 is optional. One need not do both. So long as one can identify 153 a particular component 130, one may proceed with the process 150 of assessing the vulnerability of a system 100, component 130, or both.

Obtaining the component information 156 is centered primarily on obtaining the type of information available in a specification, datasheet, or both for the particular component 130 identified 153. Obtaining 156 will typically involve obtaining 156 written materials, technical data, electronic information files containing data, text, images, access codes, schematic drawings, access methods for accessing the configuration space 122, and so forth. Upon obtaining the component information 156, the process 150 extracts 157 the configuration address information and the access method 158 for accessing the configuration space 122 of the target component 130 from the component information 156.

Extracting 157 the configuration space information and the access method 140 from the component information 156, the process 150 may create 159 a list of the full configuration space 122. In some embodiments, one may think of the configuration addresses 160 as control addresses 160. That is, in general, data in the configuration space 122 is also used to control the target component 130, and thus may be referred to in some documentation as the control address space 122.

Upon obtaining the component information 156, extracting 152 the methods 158 necessary to access 140 the configuration space 122 of the target component 130 from the component information 156 is essential to programmatic access 140 by the processor 104.

By the same token, creating 159 a list of addresses requires that creating 159 rely on the same information obtained 156 about the target component 130. Thus, creating 159 includes extracting from the information obtained 156, the configuration addresses 160.

Filtering 161 the addresses 160 results in a subset 190. That subset is made up of documented reserved address elements 124b, documented reserved test address elements 124c, and identifying undocumented address ranges within the target component 130 configuration space 122.

As a result of filtering 161, providing 162 a subset 190 results in the set 190 as the only portions of the target component 130 configuration space 122 that will actually need to be accessed 140 by the process 150. Thus, a test 163 determines whether the subset 190 or list representing a subset 190 of the original list 160 of addresses is completely handled or empty. If so, then the control path 164 bypasses most of the remaining steps in the process 150. However, the more interesting event occurs when the subset 190 is not empty, and has not yet processed all addresses in the list 190. Accordingly, a negative result to the test 163 results in selecting 165 a next address element 124 in order. That address element 124 is saved as the target address and then that address element 124 is removed 166 from the subset 190 leaving only the untested or unaccessed address elements 124 in the subset 190.

Accessing 167 the target address, a configuration address element 124, of the target component 130 is effectively the access 140 illustrated in FIGS. 1 through 3. Accessing 167 the target address will typically involve a read 136, a write 138, or a combination thereof. Most typically, one may expect an attempt of all combinations of accesses by a program in accordance with the invention.

Accessing 167 is followed by verifying 168 the operation of the component 130 target, as well as the computing system 100. For example, if the accessing 167 has failed the target component 130, then verifying 168 operation will indicate a failure operation of the component 130. That failure may or may not cause failure of the computing system 100. On the other hand, verifying 168 operation of the computing system 100 will typically indicate whether the accessing 167 of the designated or target address element 124 corresponding to the target component 130, has caused system failure.

A test 169 determines whether the component 130 and the computing system 100 remain operational. If the computing system 100 and target component 130 both remain operational, then the control path 172 causes the process 150 to again test 163. Again, if additional address elements 124 exist within the subset 190, then the process 150 continues with selecting 165 and saving the selected address element 124 in the target address, removing 166 the selected address element 124, and accessing 167 the target address as described hereinabove. If, on the other hand, all address elements 124 have been accessed 167, then the control path 164 results in exiting 171 the process 150. Thus, the loop between the test 163 and the test 169 cycles (iterates) through each address element 124 within the subset 190, in order to verify 168 the continued operation of the target component 130, and the computing system 100 in which it resides. Exiting 171 by direct result of the control path 164 indicates ongoing, unaffected, operation of the target component 130 and the computing system 100. A system failure 170 is represented by detection of non-specification compliant operation, operational inconsistencies, operational failure, corruption of data, failure to execute or operate, or a crash of a component 130 or a computing system 100.

Figure 5:
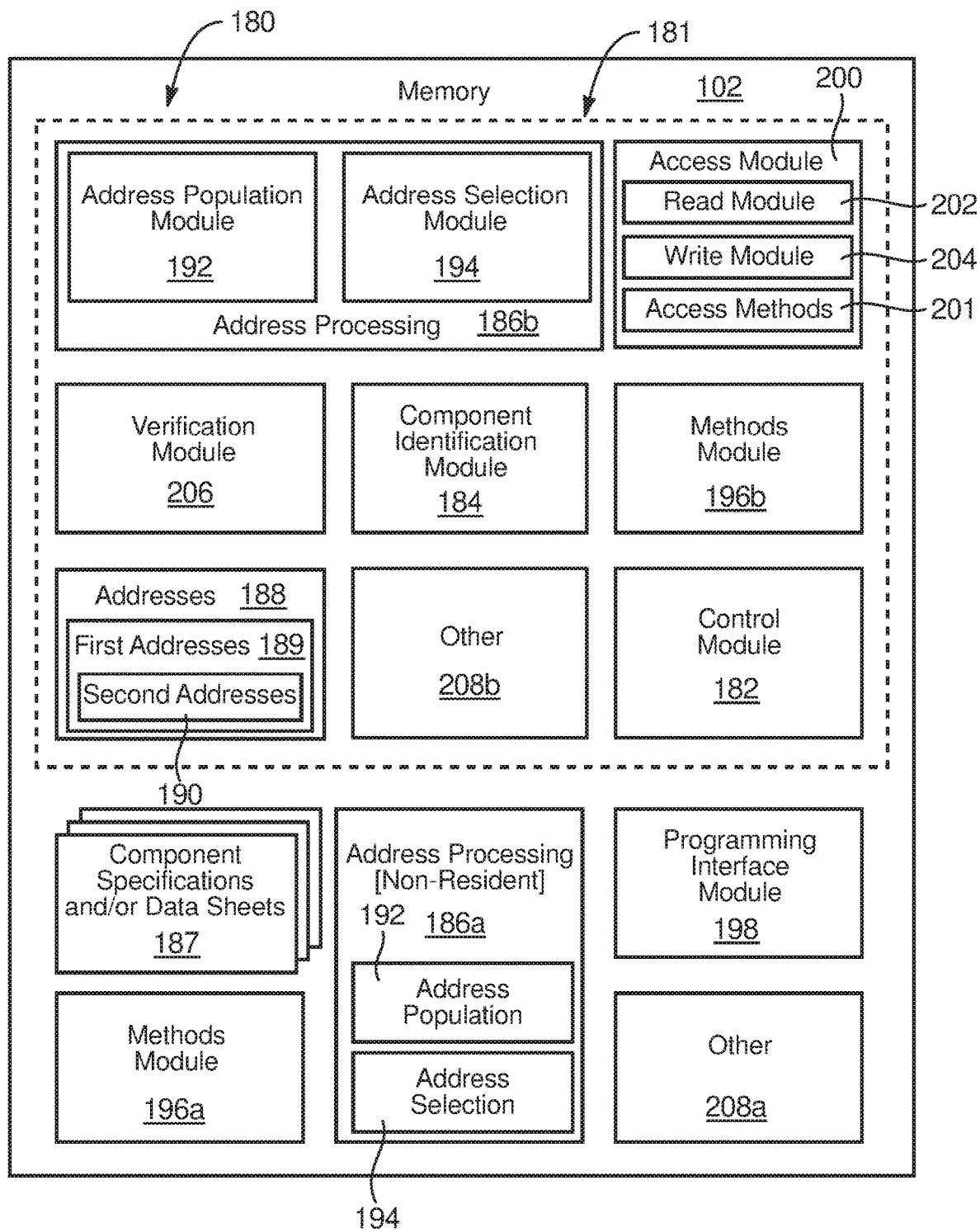
FIG. 5 is a schematic block diagram of one embodiment of a software suite of executable modules stored in computer readable storage media to implement a process in accordance with the invention, illustrating selected operational data modules containing information and data useful in implementing the process.

Referring to FIG. 5, while continuing to refer generally to FIGS. 1 through 11, a suite 180 of computer-readable modules may include a resident set 181 as well as other modules. For example, in order to reduce the overall memory footprint required by a method and apparatus in accordance with the invention, the resident set 181 may be limited to only those modules required to be involved in accessing 167 the configuration space 122.

In the illustrated embodiment, in memory 102 may be stored a control module 182 responsible (when executed) for implementing the process 150 in accordance with the invention. Initially, the control module 184 may call or otherwise engage a component identification module 184 responsible to identify 153 the target module 130 whose configuration space 122 is to be accessed 140, 167.

Thereafter, the control module 182 may engage the address processing module 186 to obtain from available data the information obtained 156. Likewise, the address processing module 186 may create 159 the list 160, and do the filtering 166 resulting in providing 162 the subset 190 in the process 150. Nevertheless, the address processing module 186 is shown in two embodiments.

The first address processing module 186a is non-resident, not part of the resident set 181 of modules. This indicates that in certain embodiments, the address processing module 186a may be executed offline, prior to other steps in the process 150, or even in other processors 104. In other embodiments, the address processing module 186a may be non-resident simply to reduce the footprint in memory required by the resident set 181. This is done by providing to the resident set 181 the subset 190.

In the illustrated embodiment, a resident 186b and non-resident module 186a are shown as options, but only one need be present as an address processing module 186. Both would not be included in most practical embodiments.

In summary, an address processing module 186 may be external to the resident set 181 or within the resident set 181. Typically, the address processing module 186 may be responsible to extract from the component specifications, datasheets, or both, as embodied in the data 187 or information 187, the addresses 188. For example, the specification or datasheets 187 contain all addresses 188. The first addresses 189 effectively cover the entire range of the configuration space 122. However, following filtering 161, the second addresses 190 are produced in order to be provided 162 as a subset 190 for access 140, 167 to the configuration space 122.

Similarly, of the sub modules 192, 194, an address population module 192 effectively defines the first addresses 189. The address selection module 194 filters the addresses 188 to extract the second addresses 190. Both may exist in the address processing module 186, regardless of whether it is the internal version 186b or the external version 186a.

However, with a minimal footprint, the address processing module 186*a*, including both its sub modules 192, 194 for populating and selecting the addresses 189, 190, respectively, is only used external to and prior to most of the operations in the resident set 181. Accordingly, it may profitably be left as an entirely external module 186*a*.

By the same token, the methods module 196*a* is responsible to extract 157 from the specifications 187 or datasheets 187, the methods 158. The methods 158 will be implemented as the access methods 201 within the access module 200. Accordingly, upon delivery of the access methods 201, the methods module 196 has no need to remain in the resident set 181. Accordingly, the methods module 196*a* is illustrated as an external module 196*a*, while the methods module 196*b* is shown as an internal module 196*b*. Either architecture is an option. Both need not be present, or the module 196 need not be in both places.

Typically, the address processing module 186 will include an address population module 192 responsible for creating 159 the complete list 160 defining the configuration space 122. Similarly, the address selection module 194 may be responsible for filtering 161 the list 160 in order to obtain the subset 190 list.

In the illustrated embodiment, the methods module 196 is next called by the control module 182 in order to extract 157 the methods 158 necessary to actually access 140, 167 the address elements 124 in the configuration space 122. Methods 158, as discussed hereinabove are unique to a specific target component 130, and, as such, require the methods module 196 to comply with specific requirements in order to codify the steps or instructions necessary for accessing 167 the elements 124.

A programming interface module 198 is typically hosted external to the resident set 181. For example, the programming interface module 198 provides access to the processor 104 and memory 102 in order to implement any programming required to implement the modules in the resident set 181. However, once established, the resident set 181 no longer need rely on the programming interface module 198.

An access method 201 implements a principal function of the access module 200. The control module 182 relies on the access module 200 to perform accesses 140, 167 directed to the specific elements 124 within the configuration space 122 and corresponding to the target component 130.

The access module 200, includes a read module 202 to effect the read access 140, 167 to the configuration space 122. Likewise, the write module 204 effects write access 140, 167 to the configuration space 122. Both the read module 202 and the write module 204 rely upon the access methods 201 peculiar and specific to the target component 130 whose configuration space 122 is being accessed 140, 167.

In addition to those modules illustrated in the suite 180, other modules 208*a*, 208*b* may be necessary for unique functionality, routine support, and underlying operation. For example, no operating environment is illustrated. Yet, within memory 102 may be an operating environment as appropriate. Similarly, other formatting, reporting, interfacing, and the like may also be done by other modules 208.

The instance of other modules 208*a* is external to the resident set 181. The instance of other modules 208*b* is within the resident set 181. Again, footprint considerations may not weigh heavily, thus obviating any need for certain external modules. On the other hand, where memory space is at a premium, or even where processing speeds may be at a premium, it may be effective to rely on a limited set 181 of modules that will actually be resident in memory 102, a storage device, a cache, a processor 104, or elsewhere.

Figure 6:
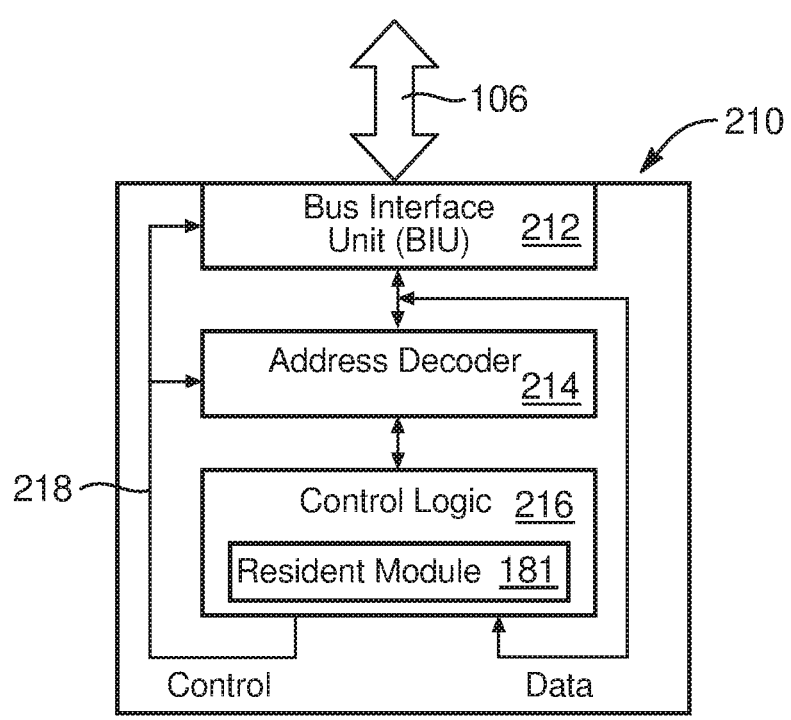
FIG. 6 is a schematic block diagram of one embodiment of a hardware unit for implementing a process in accordance with the invention.

Referring to FIG. 6, a vulnerability module 210 may be implemented in hardware. In the illustrated embodiment, the unit 210 or hardware module 210 may connect to a suitable bus 106 within the computing system 100. As illustrated in the previous embodiments, the bus 106 may be any suitable bus illustrated hereinabove. A key parameter in suitability will be the particular operating speed at which the module 210 effectively operates, may effectively communicate, or both.

In the illustrated embodiment, a bus interface unit (BIU) 212 may effect the protocol required of the module 210 in communicating over the bus 106. Accordingly, an address decoder 214 may provide the ability for the module 210 to recognize itself, and information designated for itself 210 arriving over the bus 106, through the BIU 212.

The function of the module 210 may be realized within the control logic 216. Accordingly, the BIU 212, the address decoder 214, and the control logic 216 may communicate appropriately as illustrated by the designated communication lines 218.

Typically, the control logic 216 may include the functionality of the resident set 181 or module 181. The resident module 181 embodied within the control logic 216 may be implemented in hardware, firmware, microcode, software, a combination thereof, or any subcombination thereof.

Data may be shared directly between the BIU 212 and the control logic 216. Similarly, control data may be shared between the control logic 216 and the BIU 212, directly, or between the control logic 216 and the addressed decoder 214, directly. Thus, the control logic 216 effects the access 140, 167 to the configuration space 122 of the target component 130. Accordingly, the control logic 216 need not include other processors 104 or components. The control logic 216 may be implemented in a processor 104 on board the module 210, but need not. That is, control logic 216 hardwired into the module 210 may completely effect all required accesses 140,167 needed to implement a process 150 in accordance with the invention.

Figure 7:
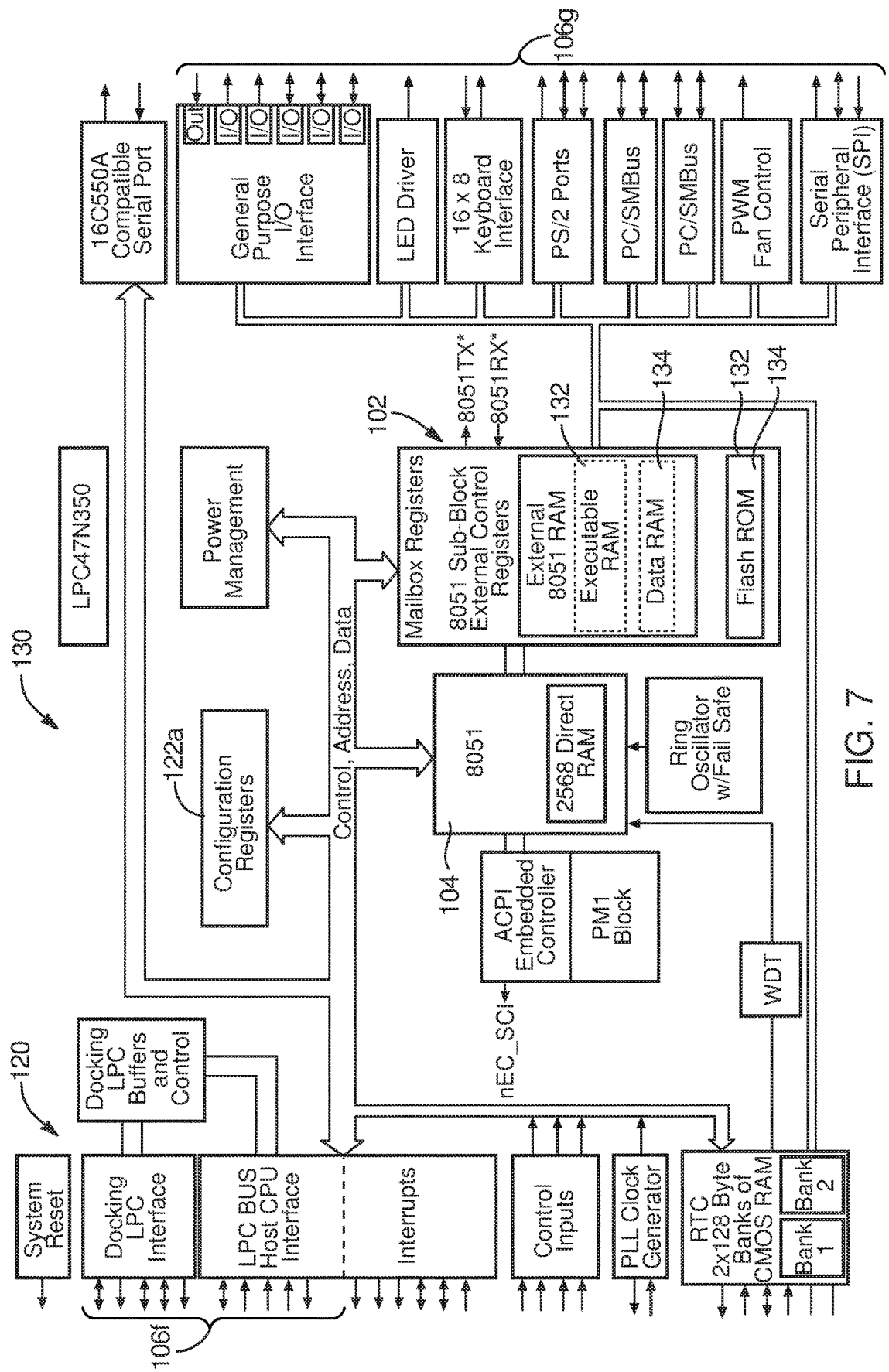
FIG. 7 is a schematic block diagram of an architecture of a computing system, a Super I/O chip having an embedded processor implementing a process in accordance with the invention, as both the target component, and the hardware implementation of the process in accordance with the invention.

Referring to FIG. 7, a Super I/O 120 in the illustrated embodiment includes a processor 104 embedded therein. As with previous embodiments, a bus 106*g* servicing various system components 130 may communicate information between the Super I/O 120 and other legacy devices 118 or the like. Meanwhile, the bus 106*f* effects communication between the Super I/O 120 and the south bridge 112.

In the illustrated embodiment, the configuration registers 122*a* are operably connected to communicate with the embedded processor 104. Associated with the processor 104 is memory 102. In memory 102 are included both executables 132 and operational data 134. Similarly, in the illustrated embodiment, flash ROM may likewise include both executables 132 and operational data 134. Memory 102 may include executables 132 as well as operational data 134.

The architecture of the Super I/O 120 of FIG. 7 implements the process 150 in accordance with the invention. Relying on loading the resident set 181 of modules into the embedded processor 104 the process 150 implements directly on the Super I/O 120 as the designated target component 130. That is, in the embodiment of FIG. 7, the resident set 181 is hosted in memory 102 and executed by the processor 104 embedded in the Super I/O 120 as a target component 130 executing its own vulnerability assessment.

In the illustrated embodiment, the reference numeral 130 includes designation arrows pointing at the Super I/O 120, and away therefrom. This indicates that in certain optional embodiments, the embedded processor 104 may be effecting the process 150 of vulnerability testing on the Super I/O 120 itself. In an alternative arrangement, the embedded processor 104, being fully capable of executing the modules 180 in the resident set 181 in memory 102, may test the vulnerability of another target component 130, elsewhere in the computing system 100. Thus, whether an external processor 104 as illustrated in FIG. 1, or an embedded processor 104 as illustrated in FIG. 7, any processor 104 in the system, capable of hosting the resident set 181, may implement the process 150 of vulnerability testing of another component 130 or a system 100.

Figure 8:
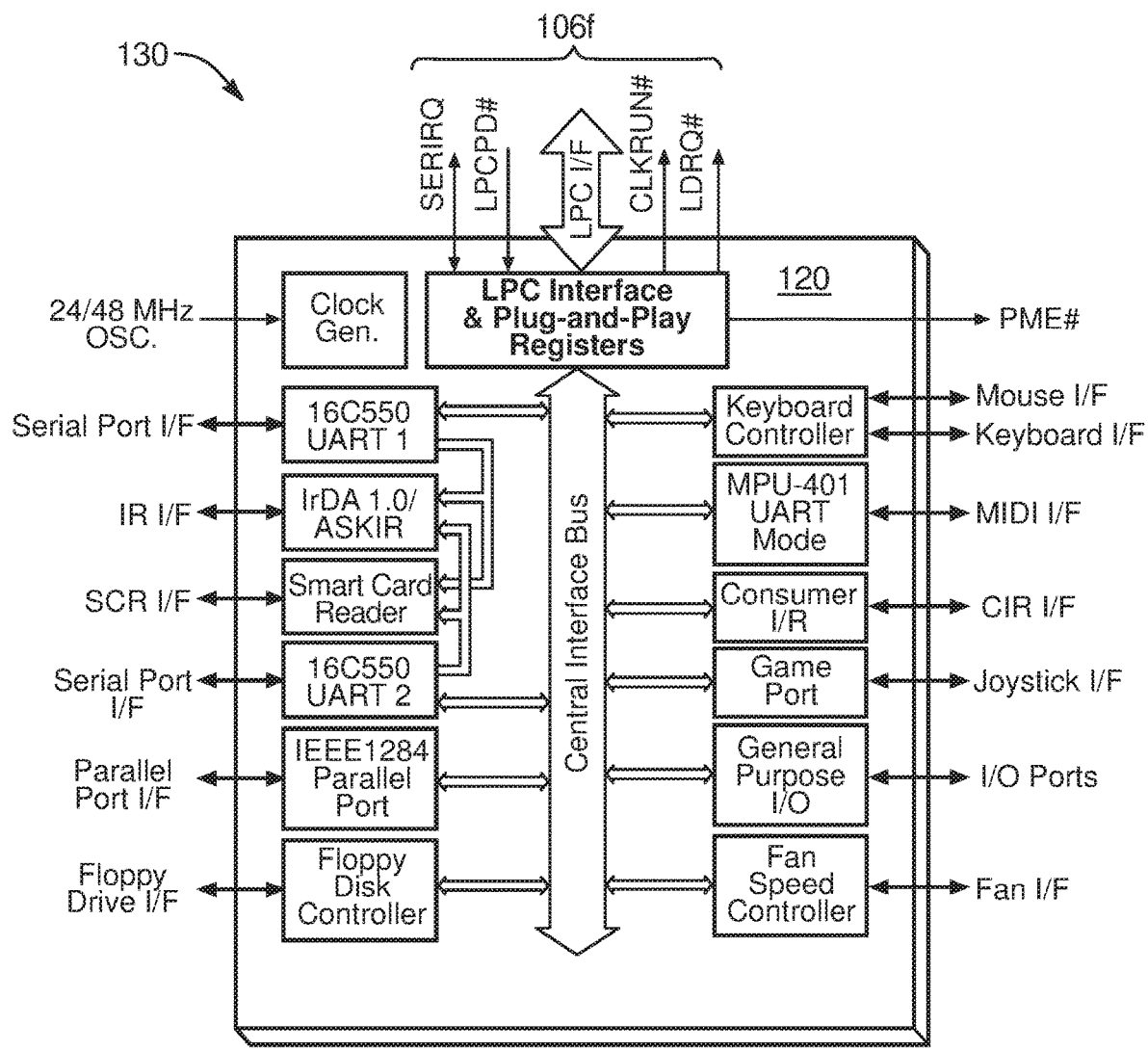
FIG. 8 is a schematic block diagram of an architecture of a Super I/O chip implemented as a target component in accordance with the invention.

Referring to FIGS. 8 and 9, in an alternative embodiment, a Super I/O 120 represents a target component 130. In this embodiment of a target component 130, a bus 106*f* connects the Super I/O 120 to the south bridge 112. The chart of FIG. 9 illustrates a portion of the global configuration registers 122 corresponding to the target component 130 of FIG. 8. One will note that the configuration space 122*a* (at least a portion thereof) is illustrated.

Here, the individual addresses 126 are indicated by the column labeled with the term "index" and the actual values 128 (after reset) are indicated in the column with the heading "reset." One will note that, in addition, a conventional element 124*a*, with its specific address 126, and value 128 corresponding thereto, is as expected. In contrast however, a reserved test element 124*c* is included. The documentation indicates that the elements 124*c* correspond to reserved test registers (are test registers), and therefore are not to be used, written to, or read.

Nevertheless, several additional elements 124*d* are undocumented. The identifying numbers written in hexadecimal format from a value of zero to a value of one are not included in the index 126 (the addresses 126). Similarly, the elements 124*d* or registers 124*d* from 3 through 6, as well as from 8 through 1F (one-fox) are not provided any documentation. Finally, in this particular chart the addresses from 2A (two-alpha) through 2D (two-dog) are undocumented.

The significance of the undocumented registers 124*d* is unknown. Whether such address elements 124*d* were used by a manufacturer or unused by anybody is unknown. Whether the processor 104 may read or write in a manner that will be completely innocuous, benign, damaging, or fatal to operation of the component 130 or the entire computing system 100 is unknown.

Figure 10:
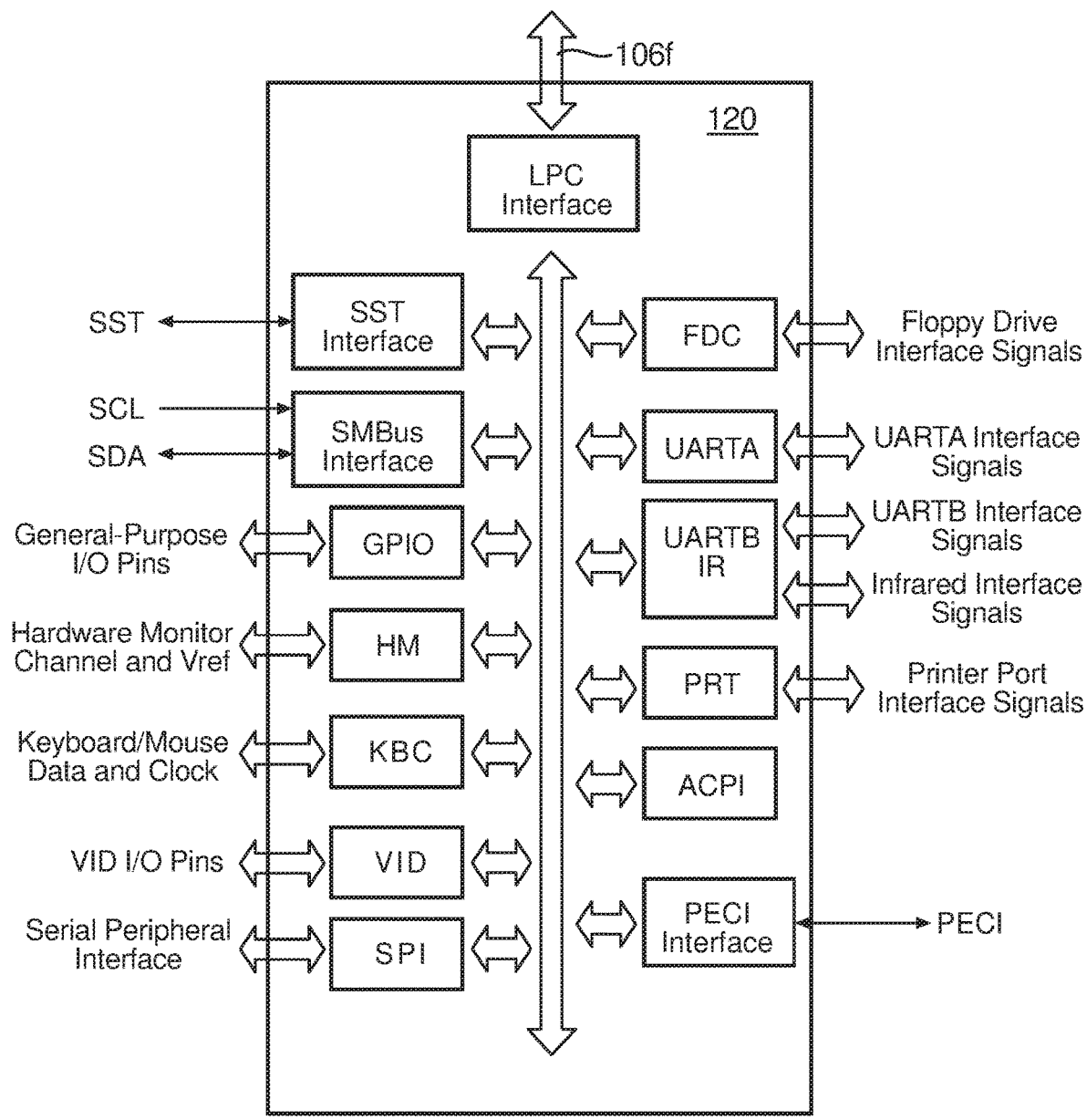
FIG. 10 is a schematic block diagram of an alternative component, this representing a Super I/O in an alternative hardware embodiment for implementation as a target for a system in accordance with the invention.

Referring to FIGS. 10 and 11, a Super I/O 120 and its chart (a partial excerpt from its configuration space 122) are illustrated. In this embodiment, the Super I/O 120 includes a unibus interconnected to numerous embedded I/O controllers. Meanwhile, the Super I/O 120 communicates with the south bridge 112 over a bus 106*f*.

Referring to FIG. 11, the partial extract of the Super I/O configuration space (chip global control registers) show they are similar to those of FIG. 9. For example, the addresses 126 in the configuration space 122*a* correspond to values 128 in the table. Likewise, undocumented address ranges are identified as the undocumented addresses 124*d*. Meanwhile, certain reserved address elements 124*b* are illustrated.

Each of the reserved elements 124*b* is effectively situated similarly to the undocumented address elements 124*d*. For example, the fact that these elements 124*b* are reserved for some function does indicate to an engineer, a programmer, developer, or other user that these addresses 124*b* are not to be accessed. However, the consequences of accidental, intentional, erroneous, or other access is unknown. Even though an address is designated and marked as "reserved" in a component's datasheet or specification, the consequences of access to such are not defined. Accordingly, it is unknown what the consequences would be for accessing 140, 167 a reserved address element 124*b* in the configuration space 122*a* of the Super I/O 120 target component 130 illustrated in FIG. 10.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method of semi-automated detection of vulnerability of a computing system, consequent to specification non-compliance of the computing system with respect to at least one of PCI and PCI Express (PCIe) features thereof, the method comprising:
    identifying a target component, addressable in the computing system and comprising at least one of a PCI component and a PCI Express component;
    obtaining a set of first addresses corresponding to the target component and controlling at least one of control and configuration of the target component;
    selecting second addresses constituting a subset of the first addresses; and
    performing, for each second address of the subset, steps comprising
        selecting, the each second address as a target address,
        accessing the target address,
        determining a system failure, of at least one of the computing system, the processor, and the target component, resulting from the accessing, and
        documenting consequences of the accessing.

2. The method of claim 1, wherein the selecting second addresses is based on a representation thereof as comprising at least one of a documented reserved address, documented reserved test address, partially documented reserved address, partially documented reserved test address; and undocumented address.

3. The method of claim 2, wherein the representation comprises a specification of the target component authorized by a manufacturer thereof.

4. The method of claim 1, wherein a condition exists, including at least one of:
    a correspondence existing between the target address and one of a register address, a memory address, and an input/output address; and
    the component being one of a physical component, a virtual component, a simulated component, and an emulated component.

5. The method of claim 1, wherein accessing constitutes at least one of reading from the target address; writing to the target address; writing to, followed by reading from, the target address; reading from, followed by writing to, the target address; and both reading from and writing to the target address, each thereof being performed at least once.

6. The method of claim 1, wherein determining the system failure comprises:
    identifying existing devices constituting at least one of PCI and PCI Express devices by issuing a PCI configuration read command for such devices possible in the computing system;

comparing a first list of actual devices so identified, to a second list of PCI and PCI Express devices documented in a component datasheet provided from a manufacturer thereof; and reporting as a system failure a detection of specification-non-compliant operation between the first list and the second list.

7. The method of claim 1, wherein determining the system failure comprises:
identifying any PCI and PCI Express devices documented by a component datasheet provided from a manufacturer thereof;
comparing a first list of the documented devices identified against a second list of actual devices existing and constituting PCI and PCI Express devices detected by issuing a PCI configuration read command for such devices possible in the computing system; and
reporting as a system failure a detection of specification-non-compliant operation constituted by inconsistency between the first list and the second list.

8. The method of claim 7 comprising reporting by:
identifying the first list before creating the second list; and
reporting upon occurrence, a first inconsistency between the first list and the second list during creation of the second list.

9. The method of claim 1, wherein determining the system failure comprises:
setting a BIOS of the computing system to a configuration corresponding to at least one of a PCI configuration and a PCI Express configuration;
creating a first list of any PCI and PCI Express device addresses from a component datasheet provided by a manufacturer thereof;
selecting a target address from the first list;
determining existence of the target device by issuing a PCI configuration read command directed to the target address;
detecting a specification-non-compliant operation in response to the PCI configuration read command; and
reporting as the system failure the detecting.

10. The method of claim 9, wherein the specification-non-compliant operation comprises failing to determine existence of at least one of a PCI device and a PCI Express device corresponding to the target address.

11. The method of claim 9, wherein the reporting comprises reporting a failure to find at least one of a PCI device and a PCI Express device corresponding to the target address.

12. The method of claim 1 wherein the consequences include an absence of at least one of a PCI device and a PCI Express device corresponding to the target address.

13. An apparatus operable as a detector of PCI-Specification-non-compliant components interconnected in a computer system, the apparatus comprising:
a processor implemented in a first chip capable of operably connecting in the computer system;
a component, operably connected to a bus identified as at least one of PCI and PCI Express compliant based on compliance with at least one of a PCI specification and a PCI Express specification;
the component, having a configuration address space including at least one of register addresses, memory addresses, and input/output addresses corresponding to the component;
a memory comprising a computer-readable, non-transitory medium, operably connected to the processor and storing executables capable of being executed by the processor and accessing at least one of documented reserved addresses, documented reserved test addresses, partially documented reserved addresses, partially documented reserved test addresses, and undocumented addresses in the configuration address space by access methods specific to the component; and
the processor, further programmed to determine a failure to function by at least one of the component and the computing system consequent to the accessing.

14. The apparatus of claim 13, wherein accessing comprises at least one of 1) reading from, 2) writing to 3) writing to, followed by reading from, 4) reading from, followed by writing to, and 5) both reading from and writing to (each performed at least once) the configuration access space.

15. The apparatus of claim 13, wherein the processor is one of external to and embedded in the component, and the component comprises at least one of another processor, an embedded other processor, a System on Chip (SoC), a Super I/O, an embedded Super I/O, a bridge chipset, an embedded bridge chipset, a Northbridge chip, an embedded Northbridge chip, a Southbridge chip, an embedded Southbridge chip, and a device connected to the processor through one or more of the foregoing.

16. The apparatus of claim 13, comprising a north bridge operably connected to the processor, south bridge operably connected to the north bridge, Super I/O operably connected to the south bridge, and individual device operably connected to at least one of the north bridge, the south bridge, and the Super I/O.

17. The apparatus of claim 13, wherein the memory contains data structures comprising executables, each constituting one or more computer instructions capable of programming functionality in the processor, and operational data, processable by the processor as programmed by the executables, thereby implementing a semi-automated determining of vulnerability of a computing system, consequent to specification non-compliance of the computing system with respect to at least one of PCI and PCI Express features thereof, the data structures comprising:
a first executable capable of identifying a target component comprising at least one of a PCI component and PCI Express component, addressable in the computing system;
a second executable capable of obtaining a set of first addresses corresponding to the target component and controlling at least one of control and configuration of the target component;
a third executable capable of selecting second addresses constituting a subset of the first addresses; and
a fourth executable capable of performing for each of the second addresses, steps comprising
selecting, the each of the second addresses as a target address,
accessing the target address,
determining whether the accessing causes a system failure of the one of the processor, the component, and the computing system, and
documenting consequences of the accessing.

\* \* \* \* \*